United States Patent
Chevalley (10) Patent No.: US 9,576,207 B2
(45) Date of Patent: Feb. 21, 2017

(54) METHOD FOR ANGLE CALIBRATION OF THE POSITION OF A VIDEO CAMERA ON BOARD AN AUTOMOTIVE VEHICLE

(71) Applicant: PARROT, Paris (FR)

(72) Inventor: Laure Chevalley, Paris (FR)

(73) Assignee: PARROT AUTOMOTIVE, Paris (FR)

( * ) Notice: Subject to any disclaimer, the term of this patent is extended or adjusted under 35 U.S.C. 154(b) by 259 days.

(21) Appl. No.: 14/561,063

(22) Filed: Dec. 4, 2014

(65) Prior Publication Data

US 2015/0161456 A1 Jun. 11, 2015

(30) Foreign Application Priority Data

Dec. 11, 2013 (FR) ...................... 13 62390

(51) Int. Cl.
| | | |
|---|---|---|
| H04N 7/18 | (2006.01) | |
| G06K 9/00 | (2006.01) | |
| G06K 9/46 | (2006.01) | |
| G01B 11/00 | (2006.01) | |
| H04N 17/00 | (2006.01) | |
| H04N 5/232 | (2006.01) | |
| G06T 7/00 | (2006.01) | |

(52) U.S. Cl.
CPC .......... *G06K 9/00798* (2013.01); *G01B 11/00* (2013.01); *G06K 9/4604* (2013.01); *G06T 7/0018* (2013.01); *H04N 5/23267* (2013.01); *H04N 7/18* (2013.01); *H04N 17/002* (2013.01); *G06T 2207/30256* (2013.01)

(58) Field of Classification Search
CPC G06K 9/00798; G06K 9/4604; G06K 9/3241; G08G 1/166; G08G 1/167; G06T 7/0018; G06T 2207/30252; G06T 2207/30256; G06T 7/0085; H04N 7/18; G06F 3/0418
See application file for complete search history.

(56) References Cited

U.S. PATENT DOCUMENTS

| | | | |
|---|---|---|---|
| 5,809,161 A * | 9/1998 | Auty ........................ | G01P 3/38 340/937 |
| 9,311,706 B2 * | 4/2016 | Natroshvili ............. | G06T 5/006 |
| 2009/0067675 A1 * | 3/2009 | Tan ..................... | G06K 9/00798 382/104 |
| 2009/0290032 A1 | 11/2009 | Zhang et al. | |
| 2010/0253489 A1 * | 10/2010 | Cui ....................... | G01S 13/723 340/425.5 |

(Continued)

FOREIGN PATENT DOCUMENTS

FR 2874300 A1 2/2006

*Primary Examiner* — Obafemi Sosanya
(74) *Attorney, Agent, or Firm* — Haverstock & Owens LLP (57) ABSTRACT

The method consists in taking, when the vehicle is running, images of the road markings delimiting the circulation lanes of the road, and in fully estimating, through an iterative process, the orientation of the camera with respect to the vehicle, based on the position of two lanes located side-by-side on the image. The calibration essentially comprises: correcting the position of the lane edges in the image (10, 12); estimating the residual pitch and yaw (16); updating the rotation matrix (18); estimating the residual roll (20); updating the rotation matrix (24). These steps are iterated until the corrective angles estimated by each module are negligible (22).

5 Claims, 4 Drawing Sheets

(56) References Cited

U.S. PATENT DOCUMENTS

2011/0228101 A1\* 9/2011 Miksch ................ H04N 17/002
　　　　　　　　　　　　　　　　　　　348/175
2013/0002871 A1\* 1/2013 Natroshvili ........... G06T 7/0018
　　　　　　　　　　　　　　　　　　　348/148

\* cited by examiner

METHOD FOR ANGLE CALIBRATION OF THE POSITION OF A VIDEO CAMERA ON BOARD AN AUTOMOTIVE VEHICLE

The invention relates to the angle calibration of the position of a camera on board a vehicle, in particular an automotive vehicle.

It applies in particular to the initial calibration of a computer-aided driving system, whether the latter is installed in factory, as an "original equipment", with no specific calibration, or as an "aftermarket equipment" by a user on his vehicle. Another example of a situation in which a calibration of the camera orientation is required is the use of a smartphone application that uses the image taken by the camera of this smartphone, mounted on a support fixed to the dashboard or the windscreen of the vehicle.

Many computer-aided driving systems are known, which implement the image taken by a camera fixed in the vehicle and that "looks at" the road. Algorithms allow to perform various functions such as: run-off-road detection, estimation of the distance with the other vehicles, anti-collision alert, obstacle detection, etc.

For all these applications, it is necessary to accurately know the position and orientation of the camera with respect to the vehicle.

In all these situations, the mounting of the camera may be very approximate, which requires the application of significant corrections to the signal delivered by the camera before being able to suitably analyse the latter. It may also be required to proceed to a subsequent readjustment of the parameters of calibration, for example to compensate for the deformations liable to be undergone by the installation.

It is difficult to install a camera at an accurate place due to the diversity of the vehicle models and of the technical constraints. If it is relatively simple to determine the position of the camera in the vehicle in terms of translational degrees of freedom (measurement of the distance between the focus point of the camera and the centre of the vehicle or the level of the ground), it is on the other hand far more difficult to accurately measure the orientation of the camera with respect to that of the vehicle in terms of rotational degrees of freedom, i.e. to determine the angle deviation between the optical axis of the camera and the longitudinal axis of the vehicle.

The object of the invention is to propose a method of automatic calibration of the orientation of a camera on board a vehicle, with a camera whose intrinsic parameters (focal length, resolution, distortion) are known, but whose relative orientation with respect to the vehicle is not known.

As will be seen, this method requires no intervention of the driver and is implemented directly based on the image of the scene taken by the camera when the vehicle is running normally. It will also be seen that this method can be applied as well to a camera located at the front of the vehicle or at the rear thereof, for example for a rear-view camera or a camera for estimating the distance with the vehicle that follows the equipped vehicle.

The angle calibration consists in evaluating a rotation (which can be expressed as a matrix) between a coordinate system linked to the camera and a coordinate system linked to the vehicle.

This rotation may be decomposed into three elementary rotations defined by pitch, roll and yaw angles, respectively. A full estimation of the rotation between the camera and the vehicle hence requires to determine these three angles.

Many angle calibration methods have already been proposed.

Among these methods, a number of them allow to fully estimate the rotation between the camera and the vehicle, but require a human intervention and/or a previous step, for example due to the use of a specific grid fixed to the system, of chequered tags laid on the ground or on a wall, or of markers fixed to the hood of the vehicle and visible by the camera.

The other methods, which use no external element and require no human intervention, have allow until now only a partial calibration, because it is not possible to estimate all the rotational degrees of freedom (pitch, roll, yaw) together.

In particular, many methods have been proposed to estimate the pitch and yaw rotations, in particular by analysing the position of the horizon and/or of the vanishing point in the image of the scene taken by the camera, as described for example in the FR 2 874 300 A1.

But these techniques allow to estimate automatically only the pitch and yaw angles between the camera and the vehicle, and not the roll angle. Other methods, such as those proposed for example by the US 20110228181 A1 and US 20090290032 A1, are based on the identification of points of interest ("feature areas") located on the ground, which are ordinary points but which have to be imperatively found from one image to the following one. It is hence necessary to have a continuous sequence of images, and to implement a complex algorithm allowing to identify reliably the "same" point of interest in two close images so as to be able to follow the displacements of this point from one image to the immediately following one.

It will only be mentioned by the way the techniques involving pairs of cameras, which produce a stereoscopic representation of the scene. It is far more simple to calibrate the position of a pair of cameras, but the techniques implemented are not transposable to a single camera, as in the present case.

The present invention has for object to solve the above-mentioned problems, by proposing a technique of full angle calibration,—i.e. according to the three pitch, roll and yaw degrees of freedom—of the orientation of a (single) camera on board a vehicle, in a fully automatic manner during a phase of driving on a road and with no intervention of the user nor use of any marker or target in a previous phase.

Another object of the invention is to provide such a technique of calibration that requires for its implementation neither continuous sequence of images nor complex algorithm of detection and tracking of points of interest in two close images.

The basic idea of the invention consists in taking, when the vehicle is running, images of the road markings delimiting the circulation lanes of the road, and in fully estimating, through an iterative process, the orientation of the camera with respect to the vehicle, based on the position of two lanes located side-by-side on the image, for example the width of the central lane (that on which the vehicle is running) and the width of the lane located on the left and/or the right of the latter.

In particular, as will be seen hereinafter, the "edges" detection has to be understood as a detection of the lines formed by the road borders and/or by the circulation lane separators (continuous or dashed white lines), wherein such detection can be made by a very simple algorithm that does not need to identify, recognize and track the "same" points on the ground from one image to the following one. Once performed the step of recognition of these lines, very few calculations are required for the calibration, and it is not necessary to have additional points of interest.

Another advantage is that the calibration according to the invention may be obtained even if there is neither continuous sequence of images nor complex algorithm of detection and tracking of points of interest in two close images. The invention may in particular be implemented based on images that are not consecutive, for example images recorded at different locations.

Moreover, the invention does not require to accurately know the height of the vehicle or the width of the lanes. Only approached quantities are used to initialise these values, which will be estimated by the algorithm.

More precisely, the invention proposes a method of the general type disclosed by the above-mentioned FR 2 874 300 A1, i.e. comprising, during a phase of displacement of the vehicle on a road, steps of:

a) taking a sequence of video images of a scene of the road, each image of the sequence comprising a plurality of traces of interest representative of ground markings of parallels circulation lanes;

b) detecting edges on the video images, to obtain a list of rectilinear edges corresponding, in each image, to said traces of interest;

c) correcting the list of edges by applying to each edge a rotation according to the estimate of the calibration matrix;

d) calculating residual pitch and yaw angles by a method of detection of the vanishing point applied to the corrected list of edges obtained at step c);

e) updating the estimate of the calibration matrix by applying a rotation according to the residual pitch and yaw angles calculated at step d).

Characteristically of the invention, this method further comprises the following successive steps:

f) calculating a residual roll angle based on the corrected list of edges obtained at step c) and on the estimate of the calibration matrix obtained at step e), by:
  estimating the respective widths of at least two circulation lanes based on the list of edges;
  comparing the so-estimated respective widths and calculating at least one lane width difference; and
  calculating the roll angle as a function the so-calculated width difference, the real widths of the lanes being supposed to be identical;

g) updating the estimate of the calibration matrix by applying a rotation according to the residual roll angle calculated at step f); and h) iterating, on at least one sequence of images, steps c) to g) until the residual pitch, yaw and roll angles are lower than a predetermined threshold.

Very advantageously, the step f) of estimating the roll angle comprises the following successive steps:

f1) correcting the list of edges by applying to each edge a rotation according to the estimate of the calibration matrix and a rotation according to the estimate of a roll matrix;

f2) for each image, based on the list of edges obtained at step f1) and as a function of a lane width reference:
  calculating the width of each of the circulation lanes detected in the image, and
  calculating a residual roll angle for each couple of circulation lanes detected in the image;

f3) for the sequence of images, calculating an average width as a function of the lane widths estimated at step f2) for the different images of the sequence;

f4) for the sequence of images, calculating an average residual roll angle based on the residual roll angles calculated at step f2) for the different images of the sequence;

f5) updating:
  the roll matrix by applying a rotation according to the average residual roll angle calculated at step f4), and
  the average reference width by the average width calculated at step f3);

f6) iterating steps 11) to f5) until the residual roll angle is lower than a predetermined threshold; and f7) extracting a roll angle estimated based on the roll matrix.

In a preferential embodiment, the step f2) of calculating the width of each of the circulation lanes and the roll angle for each couple of circulation lanes comprises:
  in case of detection in the current image of more than two circulation lanes, delivering as an output three values of lane width and two values of residual roll angle;
  in case of detection in the current image of tow circulation lanes, delivering as an output only two values of lane width and one value of roll angle;
  in case of detection in the current image of only one circulation lane, delivering as an output only one value of lane width.

Estimating the width of each of the circulation lanes can in particular comprise applying the relation:

$$\tilde{w} = H_v \cos(\alpha)(a_2 - a_1)$$

$\tilde{W}$ being the estimate of the lane width, $H_v$ being the height of the camera with respect to the ground, $\alpha$ being the angle of the vehicle with respect to the axis of the lane on which it runs, and $a_1$ and $a_2$ being the director coefficients of the edges delimiting the circulation lane in the image.

At step f2), estimating the roll angle can comprise applying the relation:

$$a_z \simeq \left(-1 \pm \sqrt{1 + \frac{W}{\tilde{w}_g} - \frac{W}{\tilde{w}_m}}\right) \times \frac{\cos(\alpha) H_v}{W}$$

W being the width lane reference or the estimation thereof, $\tilde{W}_g$ and $\tilde{W}_m$ being the lane width estimates of the considered couple of lanes, $\alpha$ being the angle of the vehicle with respect to the axis of the lane on which it runs, and $H_v$ being the height of the camera with respect to the ground.

An exemplary embodiment of the invention will now be described, with reference to the appended drawings in which the same references denote identical or functionally similar elements throughout the figures.

Figure 1:
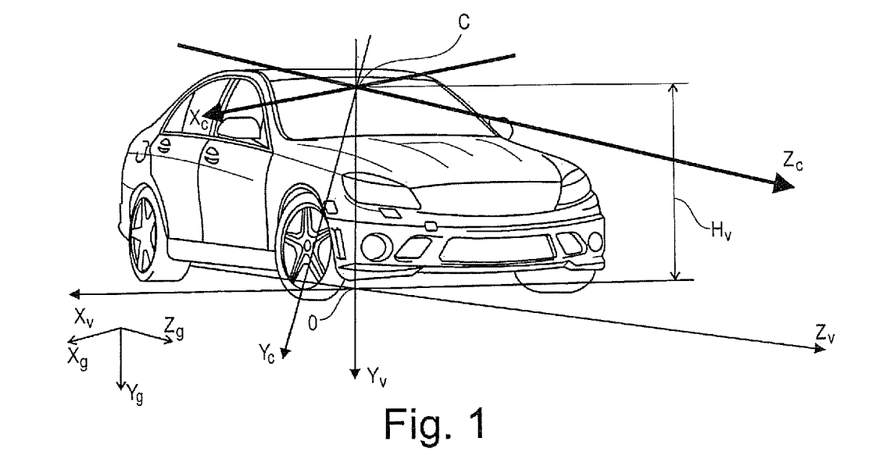
FIG. 1 is a schematic representation of a vehicle equipped with a front camera, showing the respective coordinate systems involved in the calibration method of the invention.

FIG. 1 illustrates the different coordinate systems used to define the position and the orientation of the camera C with respect to the vehicle.

They are the following coordinate systems:
the camera coordinate system $(X_c, Y_c, Z_c)$, which corresponds to the axes of the camera, the axis Z, being the optical axis and the axes $X_c$ and $Y_c$ corresponding to the axes of the focal plane for a pinhole model;
the vehicle coordinate system $(X_v, Y_v, Z_v)$, where the axis $OZ_v$ corresponds to the longitudinal axis of the vehicle and the plane $(OX_v, OZ_v)$ corresponds to the ground; and
the global coordinate system $(X_g, Y_g, Z_g)$ based on the road, the axis $Z_g$ corresponding to the axis of the road.

The objective of the calibration is to determine the rotation that exists between the vehicle coordinate system and the camera coordinate system.

Let's consider an ordinary point, with $P_v$ the coordinates thereof in the vehicle coordinate system and $P_c$ the coordinates thereof in the camera coordinate system. We have:

$$P_c = \begin{bmatrix} X_c \\ Y_c \\ Z_c \end{bmatrix} = R \times \left( \begin{bmatrix} X_v \\ Y_v \\ Z_v \end{bmatrix} + T \right) = R \times (P_v + T)$$

where T is the translation between the centres O and C of the two coordinate systems.

By definition of the vehicle coordinate system, we have:

$$T = [0 - H_v 0]$$

where $H_v$ is the distance from the camera to the point O in the vehicle coordinate system (height).

It may also be written:

$$R = Rot_X \times Rot_Y \times Rot_Z$$

with:

$$Rot_X = \begin{bmatrix} 1 & 0 & 0 \\ 0 & \cos(a_X) & \sin(a_X) \\ 0 & -\sin(a_X) & \cos(a_X) \end{bmatrix}$$

$$Rot_Y = \begin{bmatrix} \cos(a_Y) & 0 & \sin(a_Y) \\ 0 & 1 & 0 \\ -\sin(a_Y) & 0 & \cos(a_Y) \end{bmatrix}$$

$$Rot_Z = \begin{bmatrix} \cos(a_Z) & \sin(a_Z) & 0 \\ -\sin(a_Z) & \cos(a_Z) & 0 \\ 0 & 0 & 1 \end{bmatrix}$$

where $a_x$, $a_y$ and $a_z$ correspond to the pitch, yaw and roll angles, respectively.

Figure 2:
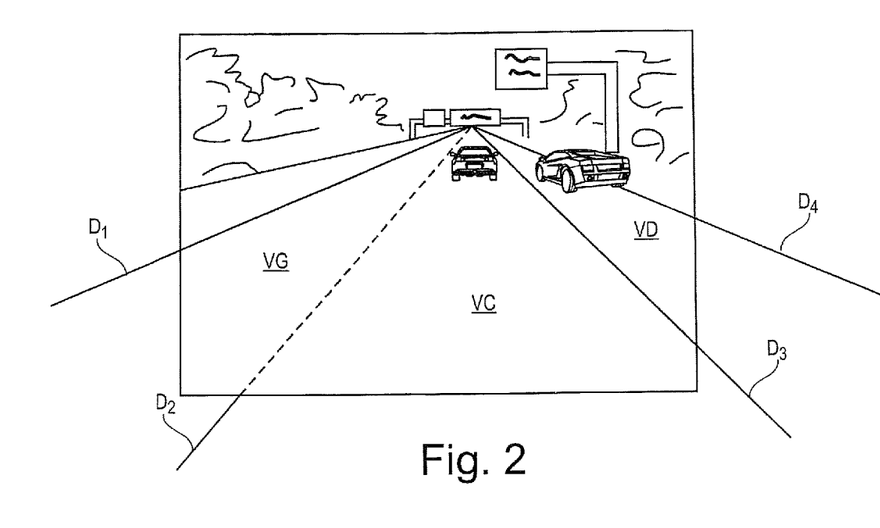
FIG. 2 is an example of scene taken by the camera, showing the ground markings delimiting the circulation lanes, as well as the geometry of the straight lines corresponding to this representation.

FIG. 2 illustrates an example of scene taken by the camera, showing ground markings delimiting circulation lanes, with, in this example, a central lane VC, a right lane VD and a left lane VG. These lanes are defined in the image by straight lines $D_1 \ldots D_4$ corresponding to the trace, in the image collected by the camera, of the ground markings delimiting these circulation lanes, such markings being hereinafter called "edges".

More generally, the lane edges obtained on an image will be denoted by $D_k$, and the list of the edges obtained on a sequence of consecutive images by $\{(D_k)_i\}$.

The estimation of the rotation will be denoted by $R_e$. Based on this estimation, the position of the edges in the image of a virtual camera in rotation $R_e$ with respect to the camera can be easily calculated. These edges, or corrected edges, will be denoted by $\hat{D}_k$. The list of the corrected edges for a sequence of images will be denoted by $\{(\hat{D}_k)_i\}$.

The extraction of the edges, i.e. the determination of the parameters defining the straight lines $D_k$ in the image, is performed by a conventional technique of image analysis, for example by detecting boundaries (which transform the image into a table of binary values to which is applied a technique of calculation of the gradients), then executing a Hough transformation, which is a well-known technique (whose principle is exposed in particular in the U.S. Pat. No. 3,069,654 A) allowing to very rapidly detect and characterize straight lines in a digitized image.

In the case of images exhibiting distortion (i.e. where the traces of the edges would not be rectilinear in the raw image taken by the camera), this distortion will be corrected before the detection of the edges, these latter being supposed to be rectilinear.

Automatic Calibration Algorithm According to the Invention

The mode of operation of the calibration method of the invention, allowing to characterize the angle position of the camera with respect to the vehicle, i.e. to determine the respective above-defined pitch, yaw and roll angles $a_x$, $a_y$ and $a_z$, will now be described with reference to the general diagram of FIG. 3 (some parts of which will be explained in more details by FIGS. 4 and 5).

Figure 3:
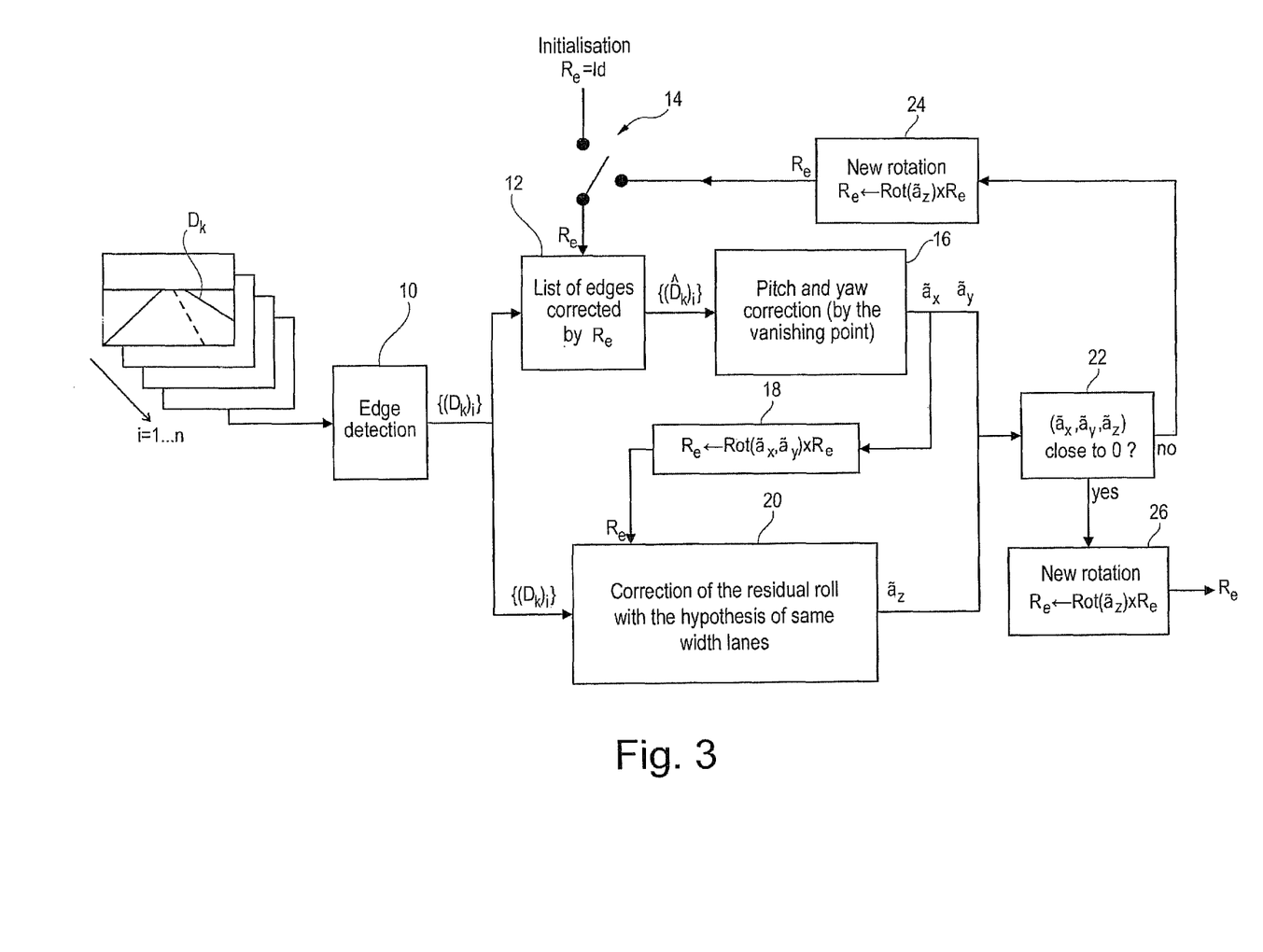
FIG. 3 is a general functional block diagram, explaining the mode of operation of the calibration method of the invention.
Figure 4:
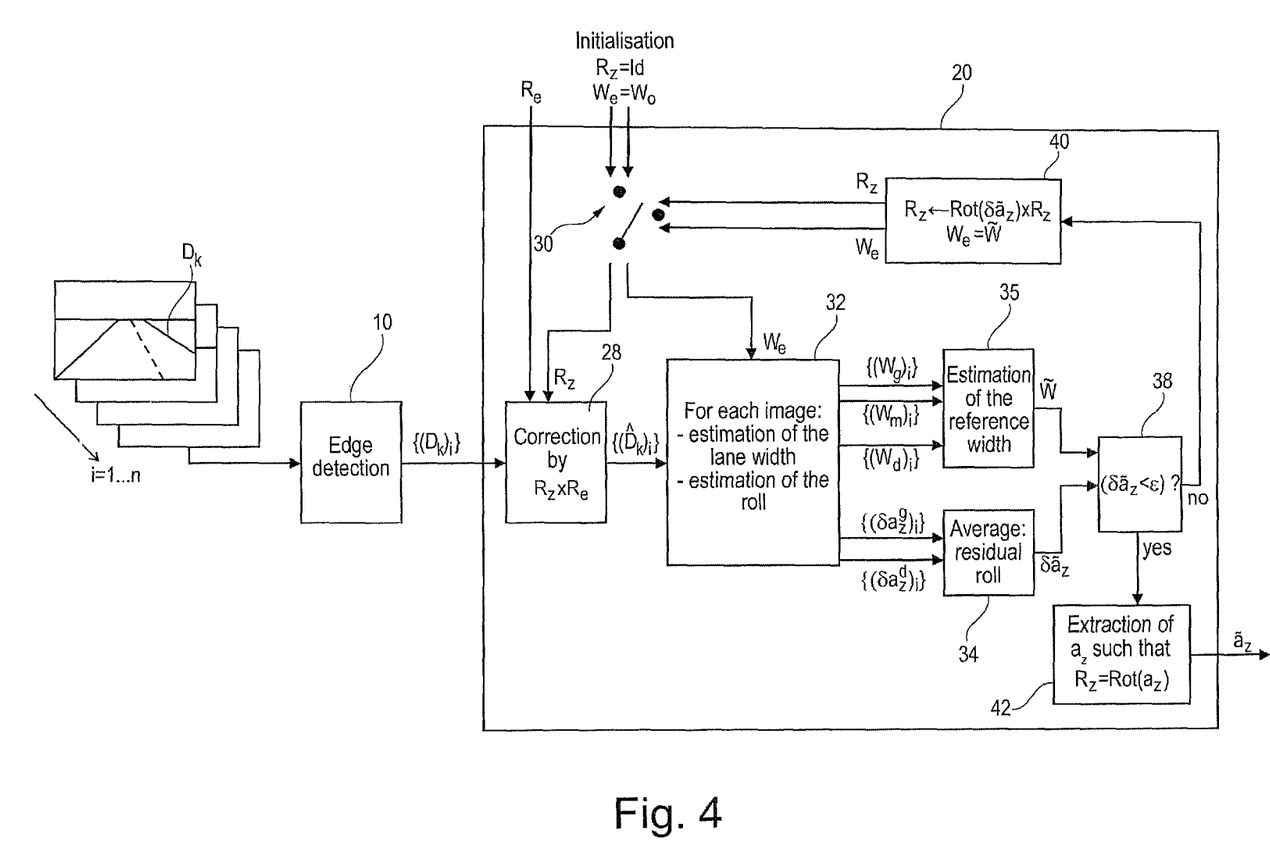
FIG. 4 is a functional block diagram, explaining in details the roll estimation algorithm of the diagram of FIG. 3.
Figure 5:
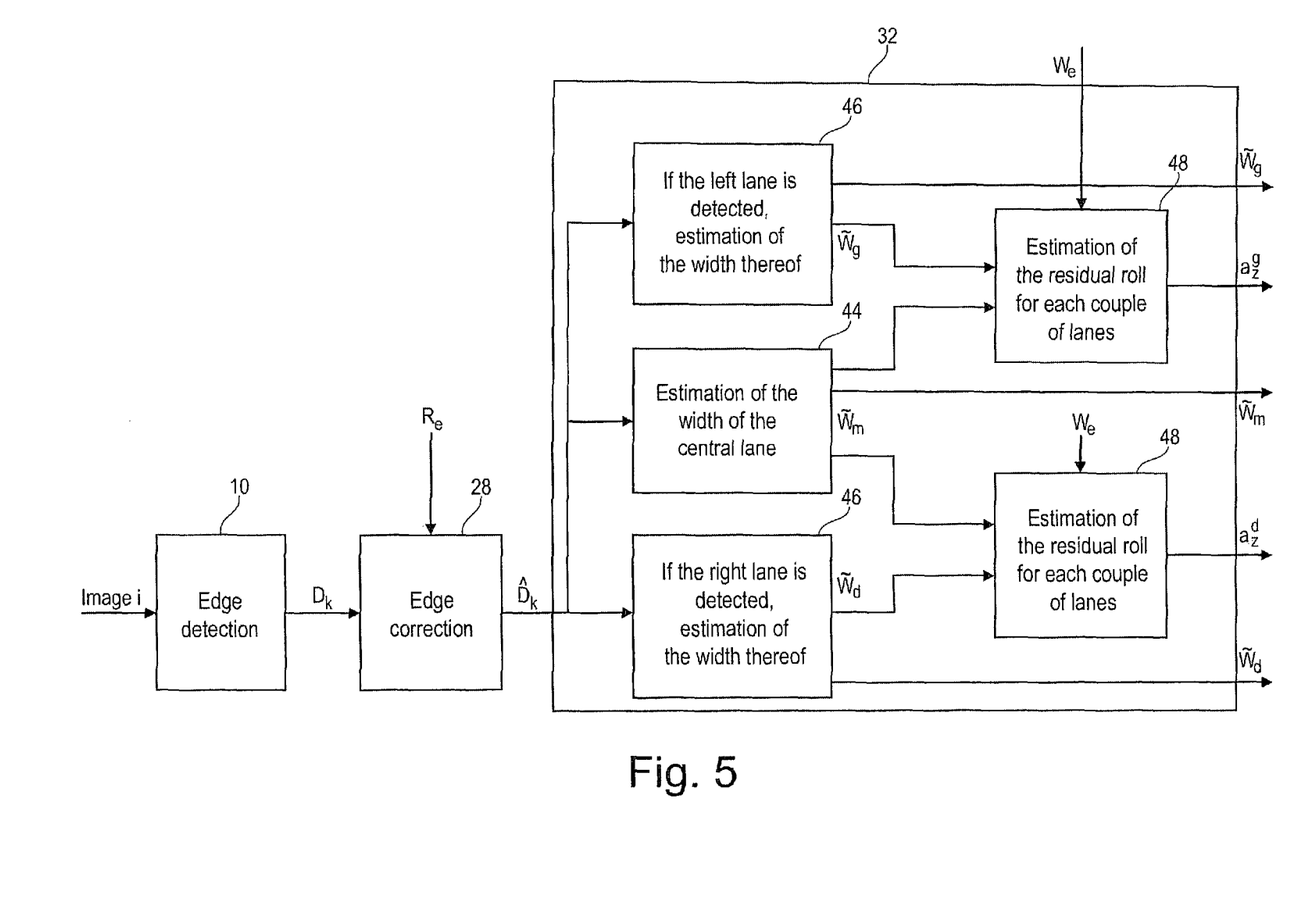
FIG. 5 is a functional block diagram, explaining in details the lane width analysis algorithm of the diagram of FIG. 4.

The diagrams of FIGS. 3 to 5 are functional block diagrams illustrating the different steps of the calibration process. It will be noted that, although these diagrams are represented as interconnected blocks, the different functions are implemented in software form, this representation being only illustrative.

Due to its non-linear character, the method of the invention implements an iterative algorithm, wherein this algorithm can be iterated either on a sequence of images, or on several sequences of images, the sequence being changed at each iteration. This second possibility allows to limit the impact of the errors of measurement on a part of the video; a first estimation of the pitch, roll and yaw angles will hence be obtained, and this estimation will then be refined as time and the various subsequent sequences go along.

It will also be noted that the method of the invention can allow an initial calibration as well as a later recalibration by fine correction of the mechanical deformations liable to appear during the use of the camera, for example a displacement of the latter on its support due to the vibrations undergone, the variations of temperature, etc.

It will be finally noted that the method of the invention can be applied to any type of camera installed in a vehicle and observing the road, whether it is a camera located on the front of the car or a rear-view camera, provided that the taken scene comprises at least two parallel circulation lanes of constant width.

The calibration essentially comprises the following steps:
correcting the position of the edges with the estimation of the rotation $R_e$ (block 12);
estimating the residual pitch and yaw (block 16);
updating the rotation matrix (block 18);

estimating the residual roll (block 20);
updating the rotation matrix (block 24).

These steps are iterated until the corrective angles estimated by each module are negligible (test of block 22).

More precisely, an edge detection processing (block 10) is applied to an input sequence of images, which allows to obtain a list of edges $\{(D_k)_i\}$.

This list of edges is corrected (block 12) by application of a rotation $R_e$ that is the estimate, for the current iteration, of the desired rotation. Initially, this estimate $R_e$ is initialised by the identity matrix Id, as schematized by the switch 14.

Based on the list of corrected edges $\{(\tilde{D}_k)_i\}$, the algorithm estimates (block 16) the residual pitch and yaw angles $\tilde{a}_x$, $\tilde{a}_y$ corresponding to the signal of error of the iterative algorithm according to these two components.

The estimation operated by the block 16 is advantageously performed by the vanishing point method, which is a well-known method: essentially, the method considers the vanishing point in the image, which is the intersection of all the edges $D_k$ of the road in the image. Let $(u_{VP}, v_{VP})$ be the coordinates of this vanishing point in the image and $f$ the focal length of the camera, if the vehicle is perfectly aligned with the road, the global coordinate system $(X_g, Y_g, Z_g)$ linked to the ground and the coordinate system $(X_v, Y_v, Z_v)$ linked to the vehicle are identical, and the following results are obtained:

$$u_{VP} = \frac{\tan(a_Y)}{\cos(a_X)} \times f$$

$$v_{VP} = \tan(a_X) \times f$$

whatever is the roll angle $a_z$.

The pitch angle $a_x$ and yaw angle $a_y$ can hence be obtained.

In practice, the vehicle is never perfectly aligned with the axis of the road, so that the previous equations are no longer exacts. To compensate for that, a sequence of images is used, which is long enough so that the vehicle can be considered as being generally aligned with the road over the duration of this sequence, and the point of intersection of the edges is calculated for each image, then an average of all the so-calculated intersection points is determined, so as to define the vanishing point whose coordinate will then allow to estimate the pitch and the yaw.

The following step (block 18) consists in updating the rotation matrix $R_e$ by applying to the value $R_e$ of the previous iteration a rotation of compensation by the residual pitch and yaw values determined by the block 16:

$$R_e \leftarrow Rot(\tilde{a}_x, \tilde{a}_y) \times R_e.$$

The so-corrected rotation matrix $R_e$ is then applied to a module (block 20) of estimation of the residual roll $\tilde{a}_z$, implementing an algorithm itself iterative, whose details will be exposed hereinafter with reference to FIGS. 4 and 5.

The residual pitch, yaw and roll values $\tilde{a}_x$, $\tilde{a}_y$ and $\tilde{a}_z$, which constitute the signal of error of the loop, are tested (block 22) and the algorithm is iterated if required by a new updating $R_e \leftarrow Rot(\tilde{a}_z) \times R_e$ (block 24) to operate a roll correction (the pitch and yaw having already been corrected in block 18). The resulting rotation matrix $R_e$ will constitute the new input value of the algorithm at block 12 for the following iteration.

The process is then continued until the residual pitch, yaw and roll angles are considered as negligible (test of block 22). If such is the case, it means that the algorithm has converged, and the final estimated value $R_e$ may then be delivered as an output, after application of a last updating $R_e \leftarrow Rot(\tilde{a}_z) \times R_e$ (block 26, identical to block 24) for a roll correction by the last value $\tilde{a}_z$ determined previously.

Module of Estimation of the Roll Angle

FIG. 4 illustrates in a more detailed manner how the determination of the residual roll $\tilde{a}_z$ is operated by the block 20 at FIG. 3.

The method is based on the following principle: for a given image, the width of the lanes visible on the image (central lane, and left and/or right lanes that have been detected) is estimated: it will be possible to estimate the roll using the difference between the estimated widths and the real width of the lanes.

The rotation due to the roll will be denoted $R_z$ and the estimation of the reference lane width, which is not known, will be denoted $W_e$.

In order to converge towards a correct estimation of the roll and of the real width, the algorithm makes several iterations. At each iteration, the previous estimation $R_z$ is used to correct the edges, then the residual roll angle $\delta a_z$ is estimated.

The inputs of the algorithm are:
- a sequence of images, on which the edge detection module (block 10) is applied. The list of edges $\{(D_k)_i\}$ is obtained;
- a correction matrix $R_e$, which comes from the pitch and yaw correction module (block 16 of FIG. 3), and possibly previous iterations of the whole algorithm;
- an initialization (schematized by the switch 30) of the reference width of the road, for example $W_e = 3$ m and of the estimation of the rotation due to the roll: $R_z = Id$.

The following steps are iterated until the residual roll $\delta a_z$ is low enough (test of block 38):
- correcting the edges with $R_z \times R_e$ to correct the pitch, the yaw and a part of the roll (block 28);
- for each image: estimating the widths and the roll for each pair of lanes (block 32, the details of which will be described hereinafter with reference to FIG. 5);
- averaging the angles over the whole sequence, giving the residual roll $\delta a_z$ (block 34);
- estimating the new width $\tilde{W}$ based on the widths estimated during the whole sequence (block 36);
- updating $R_z$ (block 40).

As regards more precisely the step of estimation of the reference width (block 36), to estimate the real width of the lanes, the whole sequence of images is used, on which are calculated the widths (par image) of the right, left and central lanes. The average of the widths are then calculated per type of lane, and the minimal width obtained is used: the use of this minimal value allows to limit the risks of having a negative factor under the root.

In the sequence of images, the module does not always detect several lanes. When on a single image the central lane is detected, the estimation of the width thereof is all the same used to estimate the reference width, but it is not possible to calculate a estimation of the roll for this image.

At time of calculating the average of the rolls per image, it is verified that there has been enough images for which several lanes have been detected.

As the iterations go along, the estimation of the real width of the lanes converges (test of block 38).

The algorithm then ends by extraction (block 42) of the value of the angle $a_z$ such that $R_z = Rot(a_z)$, allowing to measure the importance of the roll correction.

Module of Estimation of the Lane Width and of the Residual Roll

FIG. 5 illustrates in more details the operations executed by the block 32 of FIG. 4.

For a given image, the estimation is operated as follows:
detection of the edges of the image $D_k$ (block 10), the module possibly detecting a right lane or a left lane in addition to the central lane;
correction of the estimated rotation, in particular to correct the yaw and the pith (block 28, of FIG. 4);
estimation of the width of each visible lane: central lane (block 44) and right and/or left lanes (blocks 46) if these latter are visible on the image of the camera;
for each couple of lanes: estimation of the residual roll (block 48).

If three lanes are detected, the width of each lane $\tilde{w}_g$, $\tilde{w}_m$, $\tilde{w}_d$ and two roll correction angles $a_z^g$ and $a_z^d$ are estimated. If only two lanes are detected, then a single roll correction angle is estimated. If only the central lane is detected, its width is estimated, but there is no roll estimation.

More precisely, the estimation of the width of a lane (blocks 44, 46) uses the equations of the straight lines of the lane edges, such equations being given for each image by the edge detection module 10. More precisely, a lane is defined by two edges, on the left and on the right, with the following equations:

$$D_{left}: u = a_1 v + b_1$$

$$D_{right}: u = a_2 v + b_2$$

Based on these edges, the width may be estimated by:

$$\tilde{w} = H_v \cos(\alpha)(a_2 - a_1)$$

where $\alpha$ represents the angle between the vehicle and the road and $H_v$ the height of the camera.

If the height $H_v$ of the camera with respect to the ground is known, this value may be usefully used to calculate the roll angle; in the opposite case, it is possible to take any arbitrary value, for example $H_v = 1$ m, which will lately be eliminated during the iterations of the algorithm. Indeed, the estimations of the width of each lane ($\tilde{w}_g$, $\tilde{w}_m$, $\tilde{w}_d$) are proportional to $H_v$.

But, as $W_e$ is estimated based these measurements, $W_e$ is also proportional to $H_v$ and $a_z$ hence does not depend on $H_v$. The single impact of $H_v$ is during the initialisation of $W_e$: if $H_v$ is unknown, it is just necessary to give it a probable value, coherent with the initialisation of $W_e$, so that it is not necessary to know the real height of the camera.

As $b_1 = b_2 = f \tan(\alpha)$, it is possible to estimate $\alpha$ for each image by:

$$\tan(\alpha) = \frac{b_1 + b_2}{2f}$$

The previous formula to estimate the lane width is valid only if the edges are perfectly corrected. When there remains a partial rotation, it is only an estimation of the width, but thanks to the iterations, this estimation will converge towards the good result.

This calculation is valid for the central lane as for the right and left lanes.

As regards the estimation of the residual roll for each couple of lanes, we have at our disposal the detection of two parallel lanes, for example central lane and left lane. The widths of the lanes $\tilde{w}_g$ and $\tilde{w}_m$ having been estimated on each image and W representing the reference width of the lanes, it is demonstrated that the roll $a_z$ can be calculated by application of the following expression:

$$a_z \simeq \left(-1 \pm \sqrt{1 + \frac{W}{\tilde{w}_g} - \frac{W}{\tilde{w}_m}}\right) \times \frac{\cos(\alpha) H_v}{W}$$

This relation is an approximation at the first order, valid when $a_z$ is small. $H_v$ is the height of the camera with respect to the ground, and $\alpha$, which represents the angle between the vehicle and the road, is estimated based on the equations of the lane edges.

The same formula is applied for the right and central lane couple.

The invention claimed is:

1. A method of angle calibration of the position of a video camera on board an automotive vehicle, by estimation of a calibration matrix ($R_e$) defining a rotation between a coordinate system linked to the camera ($X_c$, $Y_c$, $Z_c$) and a coordinate system linked to the vehicle ($X_v$, $Y_v$, $Z_v$), this rotation being defined as pitch ($a_x$), yaw ($a_y$) and roll ($a_z$) angles, the method comprising, during a phase of displacement of the vehicle on a road, the steps of:
a) taking a sequence of video images of a scene of the road, each image of the sequence comprising a plurality of traces of interest representative of ground markings of parallels circulation lanes;
b) detecting edges (10) on the video images, to obtain a list of rectilinear edges ($D_k$) corresponding, in each image, to said traces of interest;
c) correcting (12) the list of edges by applying to each edge a rotation according to the estimate of the calibration matrix;
d) calculating (16) residual pitch and yaw angles by a method of detection of the vanishing point applied to the corrected list of edges obtained at step c);
e) updating (18) the estimate of the calibration matrix by applying a rotation according to the residual pitch and yaw angles calculated at step d);
the method being characterized in that it comprises the following successive steps:
f) calculating (20; 28, 32, 34, 36) a residual roll angle from the corrected list of edges obtained at step c) and the estimate of the calibration matrix obtained at step e), by:
estimating the respective widths of at least two circulation lanes based on the list of edges;
comparing the so-estimated respective widths and calculating at least one lane width difference; and
calculating the roll angle as a function the so-calculated width difference, the real widths of the lanes being supposed to be identical;
g) updating (40) the estimate of the calibration matrix by applying a rotation according to the residual roll angle calculated at step f); and
h) iterating, on at least one sequence of images, steps c) to g) until the residual pitch, yaw and roll angles are lower than a predetermined threshold.

2. The method of claim 1, wherein the step f) of estimating the roll angle comprises the following successive steps:
f1) correcting (28) the list of edges by applying to each edge a rotation according to the estimate of the calibration matrix and a rotation according to the estimate of a roll matrix;

f2) for each image, based on the list of edges obtained at step f1) and as a function of a lane width reference ($W_e$):
   calculating (32) the width of each of the circulation lanes detected in the image, and
   calculating (32) a residual roll angle for each couple of circulation lanes detected in the image;
f3) for the sequence of images, calculating (36) an average width as a function of the lane widths estimated at step f2) for the different images of the sequence;
f4) for the sequence of images, calculating (34) an average residual roll angle based on the residual roll angles calculated at step f2) for the different images of the sequence;
f5) updating (40):
   the roll matrix by applying a rotation according to the average residual roll angle calculated at step f4), and
   the average reference width by the average width calculated at step f3);
f6) iterating steps f1) to f5) until the residual roll angle is lower than a predetermined threshold; and
f7) extracting a roll angle estimated based on the roll matrix.

3. The method of claim 2, wherein the step f2) of calculating the width of each of the circulation lanes and the roll angle for each couple of circulation lanes comprises:
   in case of detection in the current image of more than two circulation lanes, delivering as an output three values of lane width and two values of residual roll angle;
   in case of detection in the current image of tow circulation lanes, delivering as an output only two values of lane width and one value of roll angle;
   in case of detection in the current image of only one circulation lane, delivering as an output only one value of lane width.

4. The method of claim 2, wherein, at step f2), estimating the width of each of the circulation lanes comprises applying the relation:

$$\tilde{w} = H_v \cos(\alpha)(a_2 - a_1)$$

$\tilde{W}$ being the estimate of the lane width,
$H_v$ being the height of the camera with respect to the ground,
$\alpha$ being the angle of the vehicle with respect to the axis of the lane on which it runs, and
$a_1$ and $a_2$ being the director coefficients of the edges delimiting the circulation lane in the image.

5. The method of claim 2, wherein, at step f2), estimating the roll angles comprises applying the relation:

$$a_z \simeq \left(-1 \pm \sqrt{1 + \frac{W}{\tilde{w}_g} - \frac{W}{\tilde{w}_m}}\right) \times \frac{\cos(\alpha) H_v}{W}$$

W being the width lane reference or the estimation thereof,
$\tilde{w}_g$ and $\tilde{w}_m$ being the lane width estimates of the considered couple of lanes,
$\alpha$ being the angle of the vehicle with respect to the axis of the lane on which it runs, and
$H_v$ being the height of the camera with respect to the ground.

* * * * *

UNITED STATES PATENT AND TRADEMARK OFFICE
CERTIFICATE OF CORRECTION

PATENT NO. : 9,576,207 B2
APPLICATION NO. : 14/561063
DATED : February 21, 2017
INVENTOR(S) : Laure Chevalley Page 1 of 1

It is certified that error appears in the above-identified patent and that said Letters Patent is hereby corrected as shown below:

Column 4 at Line 10; the phrase "f6) iterating steps 11 to f5)" should read -- f6) iterating steps f1 to f5) --.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*